(12) United States Patent
Townes et al.

(10) Patent No.: US 8,419,366 B2
(45) Date of Patent: Apr. 16, 2013

(54) BLADE

(75) Inventors: Roderick M. Townes, Derby (GB); Ian Tibbott, Lichfield (GB); Edwin Dane, Nottingham (GB)

(73) Assignee: Rolls-Royce PLC, London (GB)

( * ) Notice: Subject to any disclaimer, the term of this patent is extended or adjusted under 35 U.S.C. 154(b) by 396 days.

(21) Appl. No.: 12/458,412

(22) Filed: Jul. 10, 2009

(65) Prior Publication Data

US 2010/0047078 A1 Feb. 25, 2010

(30) Foreign Application Priority Data

Aug. 22, 2008 (GB) .................. 0815271.2

(51) Int. Cl.
*F01D 5/18* (2006.01)

(52) U.S. Cl.
USPC .................. 416/97 R; 416/96 R (58) Field of Classification Search .......... 415/115; 416/96 R, 96 A, 97 R
See application file for complete search history.

(56) References Cited

U.S. PATENT DOCUMENTS

| | | | | |
|---|---|---|---|---|
| 4,257,737 A * | 3/1981 | Andress et al. | ............. | 416/97 R |
| 5,813,835 A * | 9/1998 | Corsmeier et al. | .......... | 416/97 R |
| 5,975,851 A | 11/1999 | Liang | | |
| 6,234,753 B1 * | 5/2001 | Lee | ............. | 416/97 R |
| 6,932,573 B2 * | 8/2005 | Liang | ............. | 416/97 R |
| 7,976,278 B1 * | 7/2011 | Liang | ............. | 416/97 R |
| 2003/0026698 A1 | 2/2003 | Flodman et al. | | |
| 2005/0084370 A1 | 4/2005 | Gross | | |
| 2005/0249583 A1 * | 11/2005 | Mongillo et al. | ............. | 415/115 |
| 2007/0128028 A1 * | 6/2007 | Liang | ............. | 416/97 R |

FOREIGN PATENT DOCUMENTS

| DE | 10333304 A1 * | 2/2005 |
|---|---|---|
| EP | 1 630 353 A2 | 3/2006 |
| WO | WO 98/00627 A1 | 1/1998 |

* cited by examiner

*Primary Examiner* — Christopher Verdier
(74) *Attorney, Agent, or Firm* — Oliff & Berridge, PLC (57) ABSTRACT

Cooling arrangements for blades, and in particular turbine blades utilizing gas turbine engines include impingement apertures with impingement jets, which improve cooling efficiency. By providing a leading passage, which is divided at least into a lower section and an upper section, the lower section can have a wall, which is solid for structural integrity while an upper section has impingement apertures for greater cooling efficiency.

15 Claims, 6 Drawing Sheets

BLADE

BACKGROUND

The present invention relates to blades and more particularly to a cooling arrangement for utilisation with respect to a turbine blade in a gas turbine engine.

Figure 1:
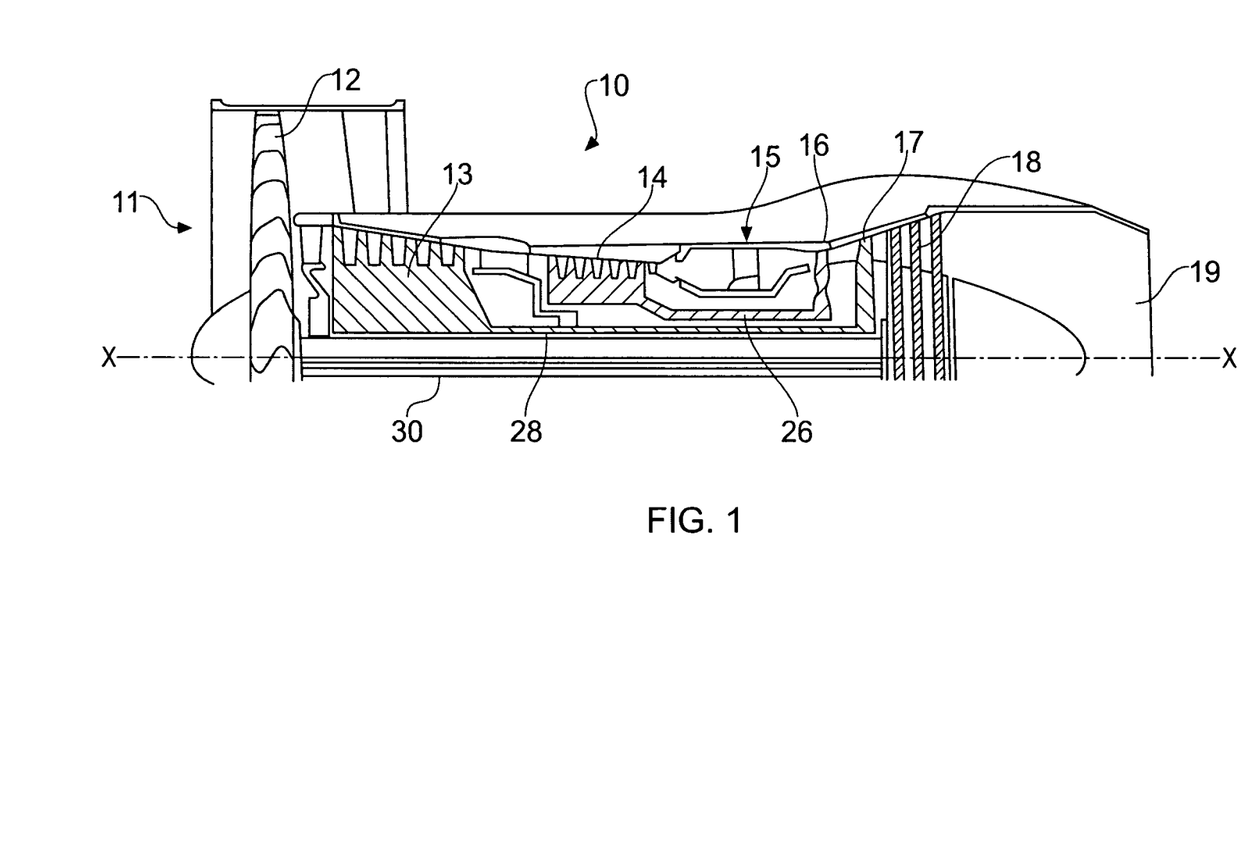
FIG. 1 is a longitudinal section through a ducted gas turbine engine incorporating an embodiment of the present invention.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produces two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

SUMMARY

In view of the above it will be appreciated that the turbine stage and in particular the high pressure turbine stage is subject to relatively high temperatures. In such circumstances in order to remain within acceptable operational parameters whilst achieving as high an operational temperature as possible it is necessary to achieve appropriate levels of cooling. It will be understood that in terms of gas turbine engine efficiency higher operational temperatures will lead to higher operational efficiencies but nevertheless acceptability and availability of suitable materials to operate at such temperatures may be limited.

Figure 2:
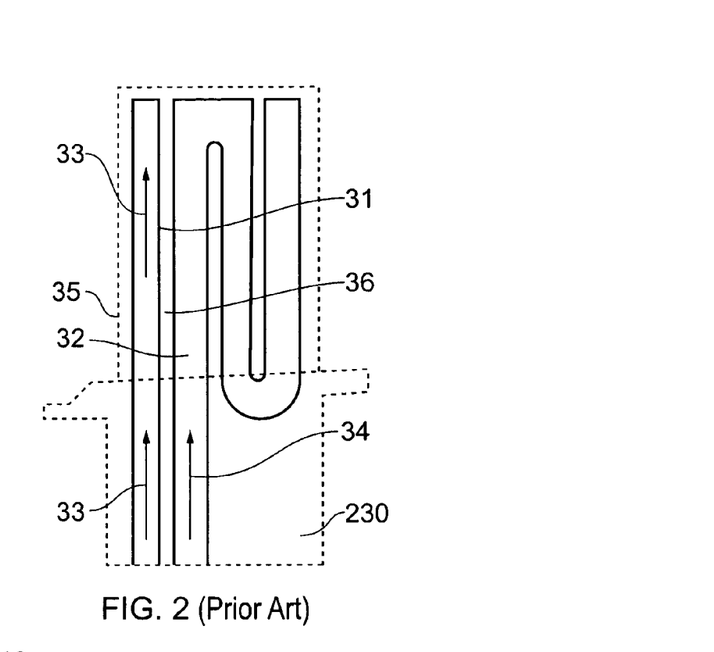
FIG. 2 is a schematic side cross section of a cooling arrangement located within a prior art blade.
Figure 3:
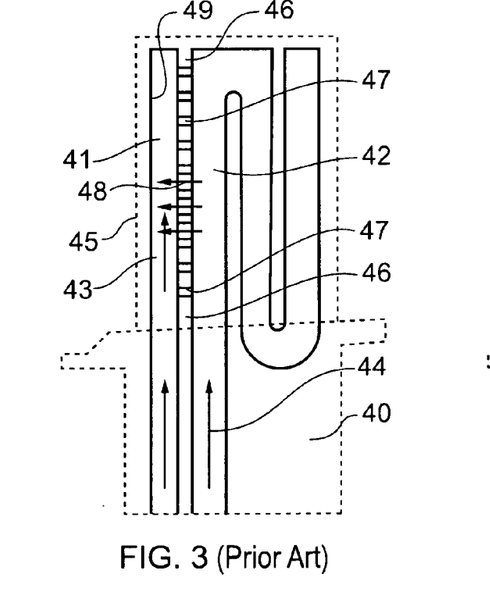
FIG. 3 is a schematic side cross section of a cooling arrangement located within an alternative prior art blade.
Figure 4:
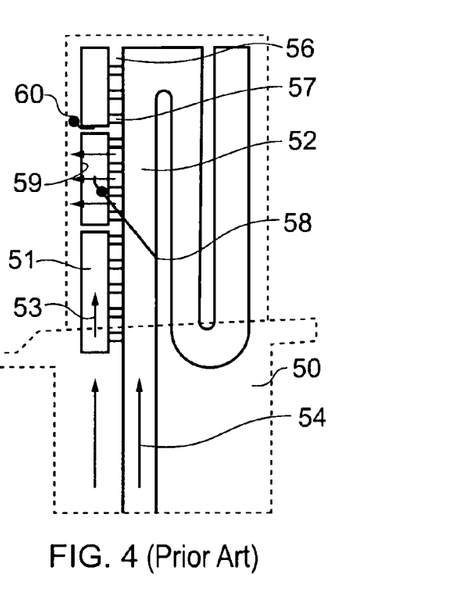
FIG. 4 is a schematic side cross section of a cooling arrangement located within an alternative prior art blade.

FIGS. 2 to 4 illustrate examples of typical prior approaches to providing cooling with respect to leading edges of a high pressure turbine blade within a gas turbine engine. It will be understood that a balance must be struck between achieving acceptable levels of cooling whilst ensuring that the cooling arrangement utilised to provide such cooling does not diminish the structural integrity of the blade in use.

FIG. 2 illustrates a first approach to providing a cooling arrangement within a blade 230. The cooling arrangement comprises a leading passage 31 and a feed passage 32. A fluid flow and in particular a coolant fluid flow moves in the direction of arrowheads 33, 34 in order to cool the blade 230. Generally, in order to improve heat transfer within the blade 230 the passages 31, 32 include ribs or turbulators which are used to create some flow turbulence whilst external surfaces will be cooled by arranging through apertures development of film cooling. In such circumstances it is possible to maintain the blade 230 (particularly along the leading edge 35) within acceptable operational temperatures. A particular advantage of the first prior approach to providing a cooling arrangement as depicted in FIG. 2 is that the leading edge is effectively reinforced by a wall section 36 which is solid and integral and therefore can take high radial stress levels without any fatigue concerns in comparison with the prior arrangements as depicted in FIG. 3 and FIG. 4 below. The arrangements depicted in FIG. 3 and FIG. 4 include internal impingement holes which will create sites for stress concentration and weakness within a blade.

In FIG. 3 a blade 40 again incorporates a leading passage 41 and a feed passage 42 in order to cool the blade 40 and in particular a leading edge 45. Fluid flows and in particular coolant fluid flows 43, 44 move along the passages 41, 42. In comparison with the arrangement depicted in FIG. 2 it will be noted that impingement apertures 47 are provided in a wall 46 between the passages 41, 42. The impingement apertures 47 are spaced along the length of the wall 46 and in view of the flow pressure of the flow 44 generates impingement cooling flows 48 projected towards a leading edge surface 49. It will be noted that the projection in such circumstances is more perpendicular towards the surface 49 and therefore generally will create improved cooling efficiency. However, by provision of the impingement apertures 47 weakness is created within the wall 46. Thus although there is potentially an improvement in cooling efficiency there is a reduction in the structural capability of the blade 40.

A further prior approach is a development of the arrangement depicted in FIG. 4 and provides a so-called box car divider wall system. In such circumstances within a blade 50 all cooling flow is provided through a single feed passage 54. A wall 56 between the passages 51, 52 is provided with impingement apertures 57 which generate impingement flows 58 towards a leading surface 59. In comparison with the arrangement depicted in FIG. 3 as indicated divider walls 60 are provided which divide up the leading passage 51. These divider walls 60 allow the flow distribution to be optimised improving the overall cooling effectiveness in comparison to the arrangement in FIG. 3. Nevertheless the presence of the apertures 57 will therefore significantly reduce the strength of the wall 56 and blade 50.

In view of the above it will be appreciated that presentation side by side of a leading passage 31 and a feed passage 32 ensures that structural integrity for a blade 230 is maintained but does not achieve best heat transfer and furthermore as typically the leading passage 31 will also include a greater quantity of apertures to external surfaces in order to develop a film cooling effect, the internal pressure within the leading passage 31 may also not be optimised.

With regard to the prior cooling arrangements as depicted in FIG. 3 and FIG. 4 it will be understood that the impingement apertures 47, 57 will improve cooling efficiency but inherently will create high stress concentrations and therefore limit the load which can actually be carried by the respective blades 40, 50. Such reductions will increase the risk of fatigue problems with respect to such blades 40, 50 in use. Prior arrangements in such circumstances have required a balance or compromise between potential cooling efficiency and long term overall blade capabilities in view of the high temperatures involved.

Aspects of the present invention provide a cooling arrangement for a blade for a gas turbine engine, the arrangement comprising a leading passage and a feed passage extending side by side along the blade and having a wall between them, the leading passage divided into a lower section and an upper section, the feed passage having impingement apertures only to the upper section through the wall whilst the wall of the lower section is solid, the relative proportion of the lower section and the upper section of the leading passage determined to provide in use a pressure differential in a fluid flow in the feed passage for impingement projection through the impingement apertures whilst the lower section through the solid wall maintains structural integrity for a blade incorporating the cooling arrangement.

Typically, the relative proportion comprises one third of the length of the leading passage as the lower section.

Generally, the lower section and the upper section are divided by a divider wall. Typically, the divider wall is perpendicular and horizontal across the leading passage. Alternatively, the divider wall is angled across the leading passage.

Possibly, the wall has a diamond cross section. Possibly, the wall at a junction with the divider wall is shaped to reduce stress concentration.

Possibly, the leading passage is further divided into additional intermediate sections. Typically, each intermediate section is divided by an intermediate divider wall. Alternatively, intermediate sections are defined by differences in an impingement aperture distribution along the feed passage.

Advantageously, the lower and/or the upper sections have exhaust apertures. Possibly, the intermediate sections have exhaust passages. Typically exhaust passages extend to the feed passage. Possibly, the exhaust passages extend to other sections of the leading passage. Possibly, the exhaust apertures extend to an external surface of a blade incorporating a cooling arrangement in accordance with aspects of the present invention.

BRIEF DESCRIPTION OF THE DRAWINGS

Aspects of the present invention will now be described by way of example with reference to the accompanying drawings in which.

DETAILED DESCRIPTION OF EMBODIMENTS

As indicated above the dual desirable objectives of achieving adequate cooling efficiency whilst maintaining structural integrity of a blade can lead to compromises. Aspects of the present invention attempt to provide improved performance. In accordance with aspects of the present invention a lower section of a blade where load and stress levels are highest is cooled by a simple radial flow in a leading passage. Thus, there are no impingement apertures to act as stress concentration areas and therefore structural integrity is maintained in this critical part of the blade. It will also be appreciated that the local gas temperature in such regions is generally reduced by leakage and seal flows which are necessary at the root of the blade. In such circumstances, in such regions impingement cooling with its greater efficiency may be considered less important.

Upper parts of the blade are cooled through cross impingement from an adjacent feed passage. As indicated above impingement flows which direct jets of coolant towards a leading surface are generally more efficient in terms of cooling efficiency but provision of impingement apertures leads to structural weakness.

In the above circumstances it will be understood that a leading passage in accordance with aspects of the present invention is essentially divided into a lower section and an upper section distinguished by the provision of impingement apertures in a wall between the leading passage and the feed passage. The relative proportion of the length of the lead passage defined respectively by the lower section and the upper section will be determined dependent upon operational requirements. It will be understood that the lower section as indicated above will provide a solid wall and in such circumstances provides greater radial strength for a blade whilst position of the upper section will enable close control of the pressure differential in order to create projection of impingement jets through the impingement apertures towards a leading surface for cooling effect. The actual proportion will typically be in the order of one third lower section to two thirds upper section in the leading passage. Generally the lower section and the upper section will be divided by a dividing wall as described later. The dividing wall may be perpendicular or horizontal across the leading passage or at an angle across the leading passage.

Figure 5:
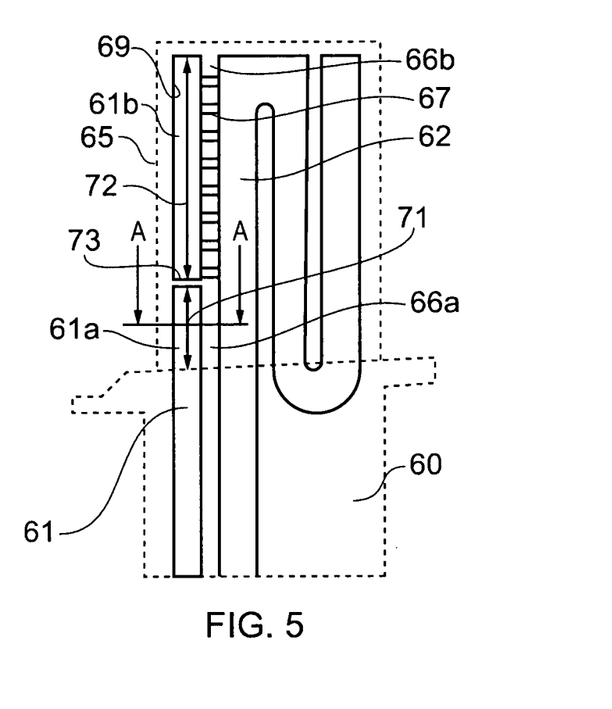
FIG. 5 is a schematic side cross section of a cooling arrangement in accordance with aspects of the present invention located within a blade.

FIG. 5 provides a schematic illustration of a first embodiment of a cooling arrangement within a blade 60 in accordance with aspects of the present invention. The blade 60 has a leading passage 61 and a feed passage 62. As described above in use fluid or coolant flows will pass generally upwards within the passages 61, 62 in order to provide cooling effect. In accordance with aspects of the present invention a lower section 61a is generally configured such that a wall 66a is solid and therefore presents significant structural integrity to lower portions of the blade 60. An upper section 61b of the lead passage is divided from the feed passage 62 by a wall section 66b. The wall section 66b incorporates impingement apertures 67 which are arranged to project coolant flows towards a leading surface 69 of the leading passage 61b in use. The distribution angling and size of the impingement apertures 67 will be chosen in order to create best effect with respect to impingement jets projected through the apertures 67 towards the inner side of the surface 69. In an embodiment, the coolant travels a greater distance to reach the upper section than a distance traveled in the lower section.

In the above circumstances by providing a leading passage which is divided into a lower section 61a and an upper section 61b benefits of strong radial strength due to the solid wall 66a and impingement jet projection towards the surface 69 are combined for an overall improvement in cooling efficiency within an arrangement as depicted in FIG. 4.

As indicated above the relative proportioning of the length of the leading passage 61 determined by the lower section 61a and the upper section 61b will be important. Generally, a lower section length 71 will be approximately one third the length of the leading passage whilst an upper section length 72 will be in the order of two thirds of the length of the leading passage but other ratios may be used dependent upon operational requirements.

Figure 12:
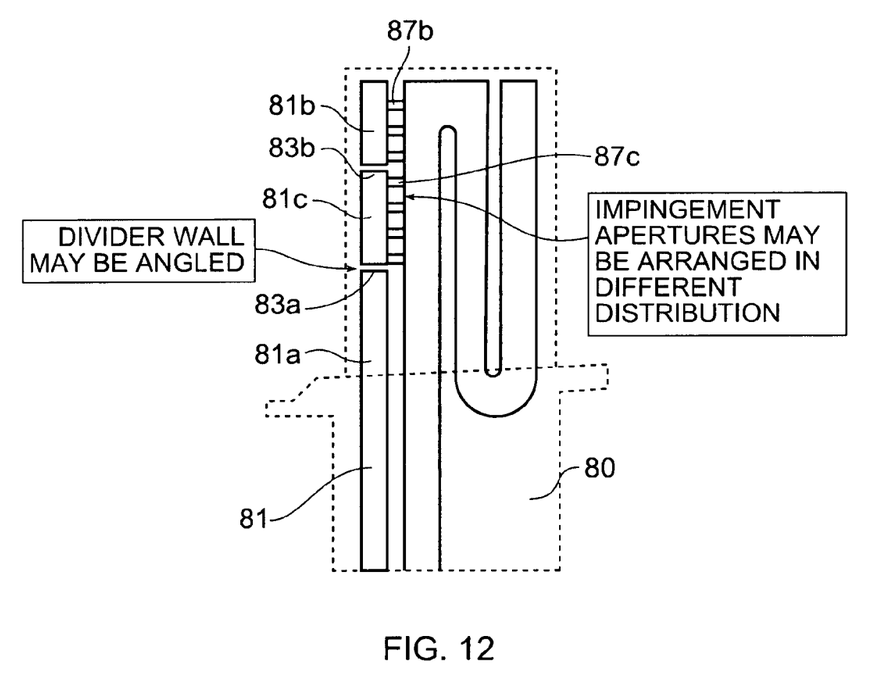
FIG. 12 is a schematic side cross section of another alternative cooling arrangement in a blade in accordance with aspects of the present invention.

In the illustration a dividing wall 73 is provided to define the respective lower sections 61a and the upper section 61b. Thus, it is by positioning of the divider wall 73 which determines the proportional length 71, 72 of the respective sections 61a, 61b. Generally, as illustrated the divider wall 73 will be perpendicular and horizontal across the leading passage 61. However, as shown in FIG. 12, an alternative the divider wall 73 may be angled across the leading passage 61 and may allow dependent upon the positioning variations in the proportioning 71, 72 of the sections 61a, 61b around a leading edge 65 of the blade 60 by angled steps. In such circumstances it may be possible to adjust the pressure differential as described below in terms of the capability with regard to presentation of the impingement jets through the impingement apertures 67 towards the leading surface 69.

Figure 6:
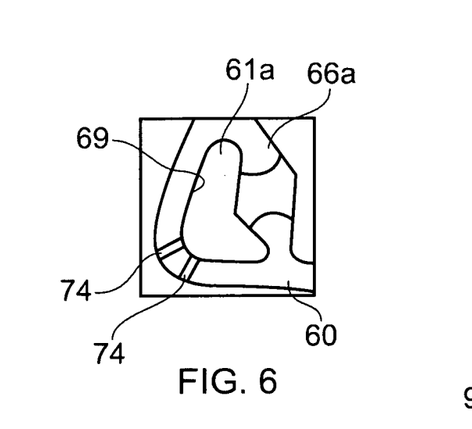
FIG. 6 is a schematic plan view in the direction A-A of the arrangement as depicted in FIG. 5.

FIG. 6 provides a cross section in the direction A-A depicted in FIG. 5. Thus, it will be noted that the wall 66a has a general diamond cross section. Such a diamond cross section will improve thermal concentration within the wall and therefore potentially improve cooling efficiency whilst the diamond section will create greater radial strength. It will be noted that the leading passage 61a incorporates film developing apertures 74 about an apex of the blade 60 in order to provide film cooling effects.

By aspects of the present invention improvements are provided with regard to achieving the benefits of impingement cooling where most needed, that is to say the upper section 61b where the external gas temperature will typically be hottest. Normally as indicated substantially two thirds of the leading passage 61 will be provided by the upper section although this may be adjusted dependent upon requirements. By achieving better utilisation of the coolant flows it will be understood that necessary coolant levels may be reduced or as there is more efficient cooling operation higher temperatures may be achieved with regard to the blade 60 in comparison with prior arrangements.

Generally in the order of a third of the leading passage 61a will define the lower section where radial stress is highest or where radial flow alone may be utilised to provide cooling particularly through utilisation of apertures 74 to create film cooling effects. In such circumstances the blade will generally have an improved fatigue life by removing the stress concentration effects of impingement holes in the wall 66a.

By judicial proportioning of the respective lower section 66a and the upper section 66b in accordance with aspects of the present invention the pressure ratio across the impingement apertures 67 can be more appropriately controlled. It will be understood that prior arrangements having impingement apertures along the whole length of the wall between the leading passage and the feed passage necessitates provision of and design for a pressure differential towards the root, that is to say the lower section. This results in pressure values which may not be optimised. By having an initial lower section 61a which has a solid divider wall it will be understood that no coolant flow is bled in the lower section and therefore flow losses need not be included in the necessary initial pressure to achieve an appropriate pressure differential towards tip or upper sections of the blade. It will also be understood that the effects of centrifugal pumping as a blade is rotated upon a rotor or disc can be utilised in order to improve pressure differentials for impingement flows through the impingement apertures 67 in accordance with aspects of the present invention. In such circumstances by consideration of the lower radial passage not feeding the lower section it will be understood that the static pressure in the feed passage may be higher allowing more efficient utilisation of what coolant flows are available.

Figure 7:
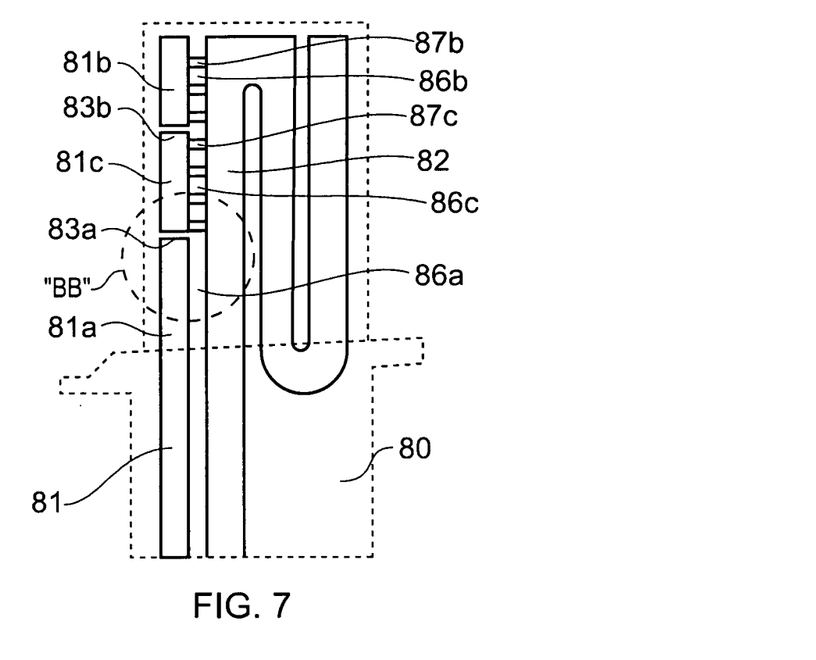
FIG. 7 is a schematic front view of an alternative cooling arrangement in accordance with aspects of the present invention.

As indicated above generally, divider walls 73 are provided between the upper section 61b and the lower section 61a of the leading passage in accordance with aspects of the present invention. A further alternative in accordance with aspects of the present invention and depicted in FIG. 7 is to provide further intermediate sections in the leading passage for further differential effects with regard to cooling efficiency and utilisation of available coolant fluid flows. As depicted in FIG. 7 a blade 80 has a leading passage 81 divided into a lower section 81a, an upper section 81b and an intermediate section 81c with a feed passage 82 positioned side by side. As previously the passages 81, 82 each receive a coolant fluid flow. The lower section 81a has a solid wall 86a and therefore receives no impingement flow from the feed passage 82. In such circumstances radial flow of a coolant provides coolant in this section 81a with apertures (not shown) providing film cooling about root sections of the blade 80. As previously the upper section 81b has impingement apertures 87b in a wall portion 86b in order to project impingement flows towards a leading surface 89 of the blade 80. The intermediate section 81c also includes impingement apertures 87c in a wall section 86c. In the illustration divider walls 83a, 83b are provided between the sections 81a, 81b, 81c respectively. Thus, the sections 81a, 81b may be defined by the positioning of the divider walls 83 or by differences in the distribution size and orientation of the impingement apertures 87 in the wall 86 or both. In any event, as previously structural strength is provided by having a solid wall 86a with sections 81b, 81c away from the root or base section of the blade 80 having impingement apertures which will provide improved cooling efficiency.

By appropriate choice of the respective proportional lengths for the sections 81a, 81b, 81c in the leading passage it will be understood that utilisation of coolant flows for heat transfer and pressure distribution can be better optimised in use. Again the divider walls 83 may be perpendicular and extend horizontally across the leading passage 81 or be angled dependent upon requirements.

Figure 8:
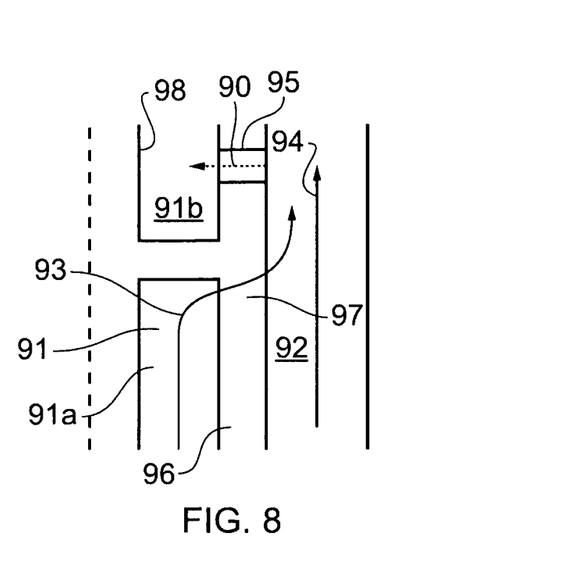
FIG. 8 is a schematic illustration of exhaust passages in accordance with one aspect of the present invention.
Figure 9:
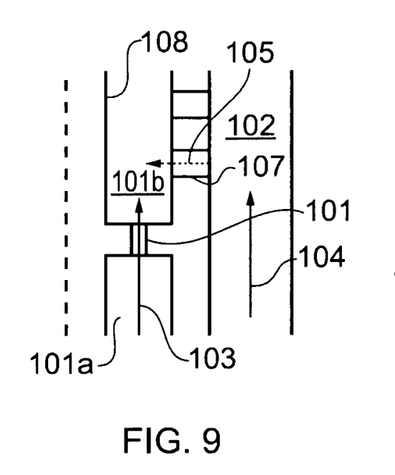
FIG. 9 is a schematic front view of exhaust passages in accordance with second aspects of the present invention.
Figure 10:
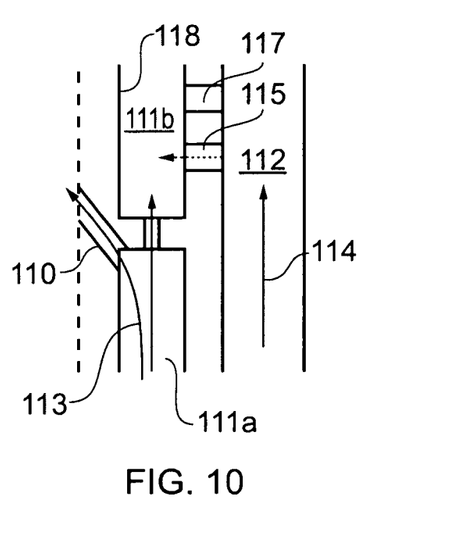
FIG. 10 is a schematic view of exhaust passages in accordance with third aspects of the present invention.

As indicated above generally the lower section of a leading passage in accordance with aspects of the present invention is essentially closed apart from apertures through which film cooling can be developed upon exterior surfaces of a blade and as described later where an exhaust is provided to regulate flow. In some circumstances it may be advantageous to exhaust some radial coolant flow in the lower sections for greater efficiency. FIGS. 8 to 10 provide illustrations with regard to utilisation of lower section coolant flows in accordance with aspects of the present invention.

Referring to FIG. 8 a blade incorporates a lower section 91a of a leading passage with a wall 96 dividing the leading passage 91 from a feed passage 92 along which a coolant flow illustrated by arrowhead 94 passes. As described above a radial coolant flow 93 within the lower section 91a will generally be utilised for film coolant development (not shown) but as illustrated in FIG. 7 a proportion of the flow 93 may pass through an exhaust aperture 97 into the feed passage 92. In such circumstances the returned flow to the feed passage 92 will add to the flow 94 within the passage 92 to increase pressure and flow volume such that impingement flows 90 through impingement apertures 95 project towards a leading surface 98 of an upper section 91b may be improved. In such circumstances coolant flow utilisation will again be improved.

FIG. 9 provides a second aspect with regard to exhaust apertures in accordance with aspects of the present invention. Thus, a lower section 101a has a coolant flow 103 whilst a feed passage 102 has a coolant flow 104. The coolant flow 104 in use as described previously extends through impingement apertures 107 to create impingement jets 105 projected towards a leading surface 108 of an upper section 101b. A proportion of the coolant flow 103 as illustrated previously will generally be presented through apertures in order to create film cooling whilst as illustrated an internal aperture 107 will connect the lower section 101a and the upper section 101b. The width diameter and configuration of the internal aperture 107 will regulate the degree of flow 103 through the aperture 101. The flow through the aperture 101 will generally be radial and will add to the cooling efficiency and coolant fluid volume along with pressure in the upper section 101b for cooling effect. Generally the upper section 101 will also include apertures for exhausting cooling flow as film cooling upon external surfaces of a blade in accordance with aspects of the present invention.

FIG. 10 provides a further illustration with regard to exhausting coolant flow from a lower section 111a. The coolant flow 113 is projected through an exhaust aperture 110 to an external surface in order to develop a film cooling effect. As previously a feed passage 112 has a coolant flow 114 in order to generate impingement jets 115 through impingement apertures 117 which are projected towards a surface 118 of an upper section 111b. In such circumstances the coolant flow 113 is utilised in addition to radial cooling within the lower section 111a also to facilitate film cooling effects on an external surface of the blade.

The exhaust apertures 97, 101, 110 in accordance with aspects of the present invention enable better utilisation of coolant flows exhausted from the lower sections 91a, 101a, 111a in order to achieve better overall performance. The exhaust apertures 97, 101, 110 effectively act as bleed holes which break out of the lower section 91a, 101a, 111a for better utilisation of already used coolant.

Figure 11:
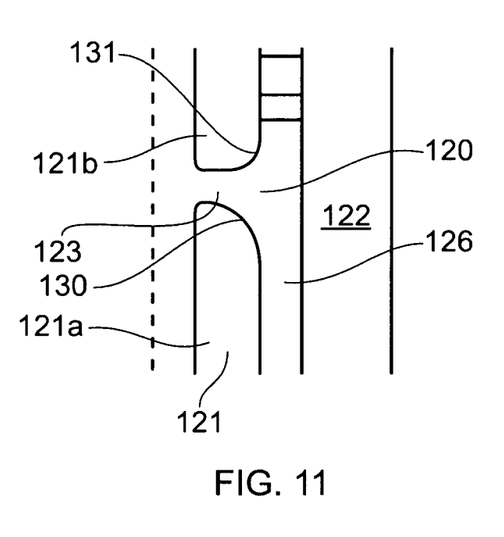
FIG. 11 provides a schematic illustration of a junction between a divider wall and a wall between a leading passage and a feed passage in accordance with aspects of the present invention.

As indicated above particular consideration with regard to aspects of the present invention is in order to create better stress concentration conditions within a blade incorporating a cooling arrangement. As illustrated in FIG. 11 reduction in stress concentrations can be achieved at a junction 120 between a divider wall 123 and a wall 126 between a leading passage 121 and a feed passage 122. As previously the leading passage 121 is divided into a lower section 121a and an upper section 121b. The divider wall 123 defines separation between the sections 121a, 121b. In order to reduce stress concentration the junction 120 is defined by fillet curvatures 130, 131 so avoiding sharp junctions which will cause stress concentration.

Modifications and alterations to aspects of the present invention will be appreciated by persons skilled in the technology. Thus as illustrated above cooling arrangements in accordance with aspects of the present invention will at least divide a leading passage into a lower and an upper section to achieve greater efficiency with regard to available coolant flows as well as maintain through structure and material form strength with regard to the blade by having a solid wall section at the root or lower part of the blade and impingement apertures at the upper sections of the blade. The wall between the leading and feed passages may be of variable thickness and it will also be understood that the orientation of the impingement apertures and their distribution may be arranged to maximise both cooling efficiency as well as structural integrity.

The invention claimed is:

1. A blade for a gas turbine engine, the gas turbine engine having axial and radial directions associated therewith, the blade comprising:
   a leading passage and a feed passage extending side by side along the blade;
   a wall between the leading passage and the feed passage;
   a divider wall, the leading passage divided into a lower section and an upper section by the divider wall;
   film developing apertures incorporated in the lower section of the leading passage; and
   impingement apertures defined by the feed passage and extending only into the upper section of the leading passage through the wall, whilst the wall along the lower section is solid,
   wherein the lower section is arranged to receive a radial coolant such that film cooling is developed upon exterior surfaces of the blade through the film apertures, in use,
   the upper section is arranged to receive coolant from the feeding passage through the impingement apertures,
   the flow of radial coolant into the lower section is separate from the flow of coolant into the feeding passage, and
   a relative proportion of the lower section and the upper section of the leading passage provides, in use, a pressure differential in a fluid flow in the feed passage for impingement projection through the impingement apertures, whilst the lower section through the solid wall maintains structural integrity for said blade.

2. A blade as claimed in claim 1 wherein the relative proportion comprises one third of the length of the leading passage as the lower section.

3. A blade as claimed in claim 1 wherein the divider wall is perpendicular to the axis of the leading passage and horizontal across the leading passage.

4. A blade as claimed in claim 1 wherein the divider wall is angled across the leading passage.

5. A blade as claimed in claim 1 wherein the wall has a diamond cross section.

6. A blade as claimed in claim 1 wherein the wall at a junction with the divider wall is shaped to reduce stress concentration.

7. A blade as claimed in claim 1 wherein the leading passage is further divided into additional intermediate sections.

8. A blade as claimed in claim 7 wherein each intermediate section is divided by an intermediate divider wall.

9. A blade as claimed in claim 7 wherein intermediate sections are defined by differences in an impingement aperture distribution along the feed passage.

10. A blade as claimed in claim 7 wherein the intermediate sections have exhaust passages.

11. A blade as claimed in claim 10 wherein exhaust passages extend to the feed passage.

12. A blade as claimed in claim 10 wherein the exhaust passages extend to other sections of the leading passage.

13. A blade as claimed in claim 10 wherein the exhaust passages extend to an external surface of the blade incorporating a cooling arrangement.

14. A blade as claimed in claim 1 wherein at least one of the lower and/or the upper sections have exhaust apertures.

15. A blade as claimed in claim 1 wherein the upper section of the leading passage also incorporates film developing apertures through which, in use, film cooling is developed on the exterior surfaces of the blade.

* * * * *